(12) United States Patent
Spruck

(10) Patent No.: US 8,311,328 B2
(45) Date of Patent: Nov. 13, 2012

(54) ELECTRONIC VISION AID AND ELECTRONIC VISION AID METHOD

(75) Inventor: Bernd Spruck, Moegglingen (DE)

(73) Assignee: Carl Zeiss AG, Oberkochen (DE)

( * ) Notice: Subject to any disclaimer, the term of this patent is extended or adjusted under 35 U.S.C. 154(b) by 842 days.

(21) Appl. No.: 12/160,174

(22) PCT Filed: Jan. 8, 2007

(86) PCT No.: PCT/EP2007/000097
§ 371 (c)(1),
(2), (4) Date: Jul. 7, 2008

(87) PCT Pub. No.: WO2007/080082
PCT Pub. Date: Jul. 19, 2007

(65) Prior Publication Data
US 2009/0067715 A1    Mar. 12, 2009

(30) Foreign Application Priority Data
Jan. 9, 2006  (DE) .......................... 10 2006 001 075

(51) Int. Cl.
G06K 9/38  (2006.01)
G06K 9/34  (2006.01)

(52) U.S. Cl. ........ 382/172; 382/176; 382/205; 382/270; 382/271; 382/272

(58) Field of Classification Search .................. 382/172, 382/168
See application file for complete search history.

(56) References Cited

U.S. PATENT DOCUMENTS

| 5,267,331 A | 11/1993 | Siwoff | |
|---|---|---|---|
| 5,889,885 A * | 3/1999 | Moed et al. .................. | 382/172 |
| 6,084,556 A | 7/2000 | Zwern | |
| 6,127,990 A * | 10/2000 | Zwern .............................. | 345/8 |
| 6,154,565 A | 11/2000 | Johnson et al. | |

(Continued)

FOREIGN PATENT DOCUMENTS

DE  40 31 404 A1  4/1992

(Continued)

OTHER PUBLICATIONS

Url http://head-mounted-display.co.tv.*

(Continued)

*Primary Examiner* — Vu Le
*Assistant Examiner* — Ha Le
(74) *Attorney, Agent, or Firm* — Patterson Thuente Christensen Pedersen, P.A.

(57) ABSTRACT

An electronic visual aid is provided that includes an evaluating unit, which is supplied with a recording of an information carrier on which information standing out visibly from the background is displayed. The evaluating unit determines a brightness distribution of the recording and derives from the brightness distribution a brightness threshold value lying in the transition zone between a zone of the brightness distribution associated with the background and a zone of the brightness distribution associated with the information. The visual aid also includes an image processing unit which generates from the recording a binary image having only two different, predetermined brightness values, by respectively assigning to the pixels of the binary image the first of the two brightness values when the brightness of the corresponding pixel of the recording is below the brightness threshold value, and otherwise assigning the second brightness value. Also included is a display unit which displays the binary image and is provided as an HMD device.

14 Claims, 2 Drawing Sheets

U.S. PATENT DOCUMENTS

| | | | |
|---|---|---|---|
| 6,522,531 B1 * | 2/2003 | Quintana et al. | 361/679.03 |
| 7,199,840 B2 * | 4/2007 | Shiota | 348/678 |
| 2001/0036314 A1 | 11/2001 | Yamaguchi et al. | |
| 2002/0158815 A1 * | 10/2002 | Zwern | 345/7 |
| 2004/0136570 A1 | 7/2004 | Ullman et al. | |

FOREIGN PATENT DOCUMENTS

| | | |
|---|---|---|
| DE | 201 13 278 U1 | 3/2002 |
| DE | 202 09 101 U1 | 3/2003 |

OTHER PUBLICATIONS

Linda Shapiro, George Stockman, Computer Vision, Prentice Hall, ISBN-0-13-030796-3, Published 2001.*

Hui-Fuang Ng, Automatic thresholding for defect detection, Pattern Recognition Letters, Feb. 2006.*

Eli Peli, "Simple 1-D image enhancement for head-mounted low vision aid," *Visual Impairment Research—1999*, vol. 1, No. 1, pp. 3-10 (1999).

* cited by examiner

ELECTRONIC VISION AID AND ELECTRONIC VISION AID METHOD

The present application is a National Phase entry of PCT Application No. PCT/EP2007/000097, filed Jan. 8, 2007, which claims priority from German Application Number 102006001075.2, filed Jan. 9, 2006, the disclosures of which are hereby incorporated by reference herein in their entirety.

FIELD OF THE INVENTION

The invention relates to an electronic visual aid and to an electronic visual-aid method.

BACKGROUND OF THE INVENTION

As the simplest known aid for the visually impaired, magnifying glasses (including electronic ones) are known which magnify the text to be read (where the text to be read may be information which is represented on an information carrier, e.g. paper, in a visibly outstanding manner) to such an extent that visually impaired persons can read the text. Such magnifying glasses may comprise, for example, a camera, which can be placed on the text to be read, and an HMD device (Head-Mounted Display device) connected to said camera. In addition to magnification, false color representations are also known. Further, it is possible to provide a head camera which is mounted to the HMD device itself, instead of the camera which can be placed on the text. Such a device is described, for example, in DE 202 09 101 U1.

DE 201 13 278 U1 describes an electronic visual aid wherein the visual information is processed in terms of size, color, shape, contrast, extent, line width, number of lines, line transport, and is displayed, for example, via a projector. This is carried out such that the viewer can perceive an entire line of the visual object in sufficient shape, color and size.

In practice, however, it has turned out that, for example, the color of the text, the color of the background, as well as the reflectivity of the background and of the text itself may vary to a very great extent. A further influencing factor is, for example, the illumination of the text to be read. It is not possible to have one single setting of a visual aid that is optimal for all variations of the influencing factors.

SUMMARY OF THE INVENTION

In view of the above, it is an object of the present invention to provide an electronic visual aid as well as an electronic visual-aid method allowing information which stands out visibly from the background to be displayed with optimized contrast, regardless of the recording conditions.

According to the invention, this object is achieved in one embodiment by an electronic visual aid comprising an evaluating unit, which is supplied with a recording of an information carrier on which information standing out visibly from the background is displayed, and which evaluating unit determines a brightness distribution of the recording and derives from said brightness distribution a brightness threshold value lying in the transition zone between a zone of the brightness distribution associated with the background and a zone of the brightness distribution associated with the information. The electronic visual aid further comprises an image processing unit which generates from the recording a binary image having only two different, predetermined brightness values, by respectively assigning to the pixels of the binary image the first of the two brightness values when the brightness of the corresponding pixel of the recording is below the brightness threshold value, and otherwise assigning the second brightness value, and comprising a display unit which displays the binary image and is provided as an HMD device.

Determining the brightness threshold value allows to define the optimal threshold value for the binary image so that, even under different recording conditions, the optimum brightness threshold value is used in each case in order to generate the desired binary image with the greatest possible contrast.

Using the HMD device (an HMD device is a display device which can be carried or mounted, respectively, on the user's head), the binary image can be presented to the user in excellent quality as a virtual image.

The evaluating unit can determine the brightness distribution in the form of a histogram and subject the histogram to low-pass filtering before deriving the threshold value. Due to the low-pass filtering, undesired high-frequency variations in the histogram are filtered out. The histogram can be prepared easily and quickly.

In particular, the evaluating unit can determine the threshold value on the basis of the gradient run of brightness distribution. Thus, it was found that the basic shape of the brightness profile is substantially always a step shape, regardless of the recording conditions. The step exhibiting the lower frequency of the brightness values is usually associated with the text, whereas the step exhibiting the higher frequency is usually associated with the background. Only the transition zone between these two steps changes to higher or lower brightness values, depending on the actual illumination. The gradient of the transition remains substantially the same, so that the actual transition between the brightness for the text and the brightness for the background can be determined on the basis of the gradient run.

The brightness distribution may also be standardized before the brightness threshold value is derived. This allows the attainment of very comparable gradient values.

The electronic visual aid may further comprise a recording unit for generating the recording. This may include conventional CCD cameras, CMOS cameras or other video cameras. The camera may comprise built-in LED lighting, so that the illumination of the text or of the information, respectively, can be kept as constant as possible, for example.

In particular, the electronic visual aid may be constantly supplied with new recordings, in which case the evaluating unit derives the brightness threshold value of only one of a predetermined number of consecutive recordings, and the image processing unit uses the brightness threshold value thus derived in order to generate the binary images until the evaluating unit has determined a new threshold value and transmitted it to the image processing unit. This allows to reduce the required computing performance of the evaluating unit. This is advantageous particularly with a view to real-time applications.

The object is further achieved by an electronic visual-aid method, which comprises determining a brightness distribution of a supplied recording of an information carrier on which information visibly standing out from the background is represented and deriving a brightness threshold value from said brightness distribution, which threshold value is located in the transition zone between a zone of brightness distribution associated with the background and a zone of brightness distribution associated with the information; generating from said recording a binary image having only two different, predetermined brightness values by respectively assigning to the pixels of the binary image the first of the two brightness values, when the brightness of the corresponding pixel of the recording is below the brightness threshold value, and otherwise assigning the second brightness value, and displaying the binary image, for which purpose an HMD device is employed. Using this method, binary images with optimized contrast can be generated regardless of the recording conditions, and the binary image can be presented to the user in excellent quality by the HMD device.

The brightness distribution can be determined in the form of a histogram, and the histogram can be subjected to low-pass filtering before deriving the threshold value. Said low-pass filtering allows undesired high-frequency variations in the histogram to be filtered out. Nowadays, a histogram can be generated in a quick and simple manner, so that the method can be carried out quickly on the whole.

The brightness threshold value can be determined on the basis of the gradient run of the brightness distribution. In particular, the brightness distribution is standardized before determining the brightness threshold value. Thus, the optimum brightness threshold value can be safely determined in a simple manner.

The method according to the invention allows the use of constantly supplied recordings to constantly generate the corresponding binary images, in which case the brightness threshold value may be determined on the basis of one of a predetermined number of recordings.

BRIEF DESCRIPTION OF THE DRAWINGS

The invention will be explained in more detail below by way of example and with reference to the attached drawings, wherein.

DETAILED DESCRIPTION

Figure 1:
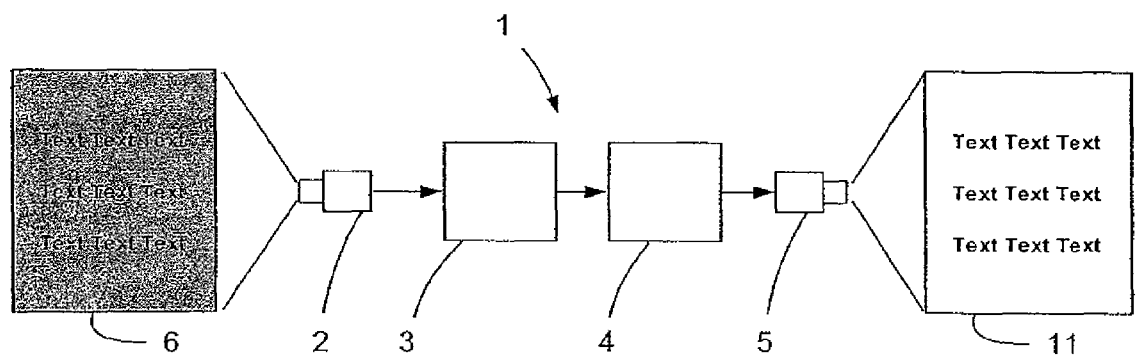
FIG. 1 shows a schematic view of an embodiment of the electronic visual aid according to one embodiment of the invention.

The embodiment schematically shown in FIG. 1 comprises the electronic visual aid 1, a recording unit 2, an evaluating unit 3, an image processing unit 4, as well as a display unit 5.

The recording unit 2 records a sheet of paper 6 (information carrier), on which a text (information) to be read is printed. Although the text stands out visibly from the background, the sheet of paper, as schematically shown in FIG. 1, may not be white, but may be light gray, so that the contrast between the text and the background is relatively low. This makes it very difficult for visually impaired persons to read the text.

The recording, generated by the recording unit 2, of the text on the sheet of paper 6, is supplied to the evaluating unit 3, which determines a brightness distribution of the recording. Such a brightness distribution is shown schematically in FIG. 2, wherein the brightness values are plotted along the x axis and the frequency of the corresponding brightness values is plotted along the y axis.

Figure 2:
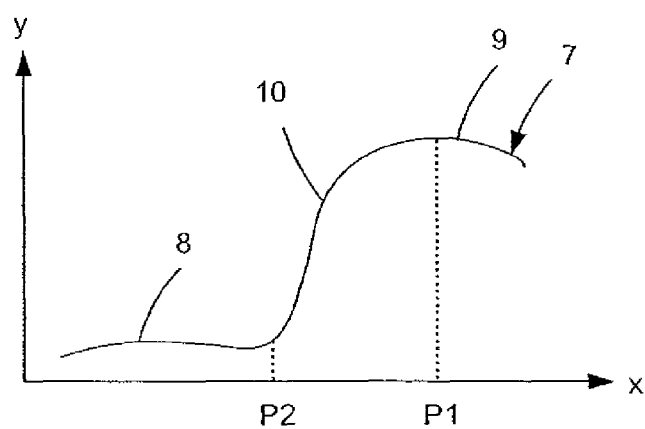
FIG. 2 shows a schematic view of the brightness distribution of a recording.

As is evident from the representation of FIG. 2, the brightness distribution 7 has a substantially step-shaped profile. The step-shaped profile comprises a first zone 8 of low brightness and low frequency, which corresponds to the text in the recording, a zone 9 of great brightness and high frequency, which corresponds to the background of the recording, as well as a transition zone 10, which is located between the zones 8 and 9. It has been found that in the case of texts the brightness distribution of the recording always has a step-shaped profile, in principle. Only the transition zone 10 shifts along the x axis, depending on the actual illumination at the time of recording, the color of the paper and other external influences.

The evaluating unit 3 can also subject the determined brightness distribution to low-pass filtering in order to filter out undesired high-frequency variations. For the distribution shown schematically in FIG. 2, it is assumed that low-pass filtering has been carried out. Since high brightness values are often accompanied by a decrease in frequency (as also shown in FIG. 2), the evaluating unit 3 first determines the brightness having the greatest frequency (in this case, point P1). Starting from this point, the brightness distribution 7 towards the zone 8 is analyzed in order to determine the transition between the zones 8 and 9. In this case, a brightness value in the transition zone 10 which is as close as possible to the zone 8 (and, thus, closer to the zone 8 than to the zone 9) is advantageous. The transition point P2 is determined here. Then, the brightness value P2 is defined as the brightness threshold value.

Finding the threshold value can be effected, for example, by forming the first derivation of the brightness distribution 7 and determining the brightness value for which the derivation has a predetermined value (a predetermined gradient). When determining the brightness threshold value on the basis of the first derivation of the brightness profile 7, the brightness profile 7 is preferably standardized before forming the first derivation so as to obtain comparable values. The gradient value may be, for example, a gradient of less than 45% or less than 10%. In order to be able to determine the brightness value P2, the second derivation of the brightness profile 7 can also be taken into consideration, in particular. Thus, on the one hand one can make sure, via the mathematical sign of the second derivation, to be at the lower region of the slope of the transition zone 10 (i.e., near the zone 8) and not at its upper region (i.e. near the zone 9). As an alternative, the turning point can be determined (the second derivation equals 0), and from this turning point towards smaller x values, that brightness value can be determined at which the gradient (first derivation) begins to become smaller than a predetermined gradient (45% or, for example, 10%). Proceeding in this manner, the brightness threshold value P2 will be found with certainty.

The recording made by the recording unit 2, as well as the brightness threshold value P2 of the evaluating unit 3, are supplied to the image processing unit 4, which generates from said recording a binary image having two different, predetermined brightness values. For this purpose, the image processing unit 4 respectively assigns the first of the two brightness values to the pixels of the binary image to be generated, when the brightness of the corresponding pixel of the recording is below the brightness threshold value P2. If this is not the case, the second brightness value will be assigned to the pixels. If the first brightness value is defined as the minimum possible brightness value (i.e. black) and the second brightness value is defined as the maximum possible brightness value (i.e. white), a binary image with maximum contrast is generated. This binary image is supplied to the display unit 5 which then displays it, e.g., on a screen 11 which is part of the display unit 5.

The binary image and the recording from which the binary image is generated preferably have the same size or the same number of pixels, so that there is a 1:1 allocation between the pixels. If the recording has a resolution of n×m points, a binary image having n×m pixels is thus generated.

The display unit 5 may comprise, for example, a conventional screen, a projection device or even an HMD device (Head Mounted Display device) which a user carries on his head and which presents the binary image to the user as a virtual image.

Figure 3:
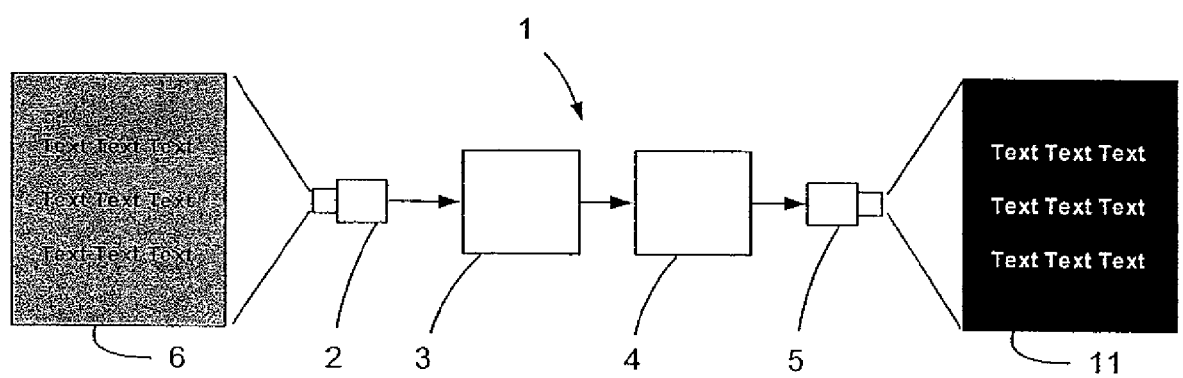
FIG. 3 shows a schematic view of a further embodiment of a visual aid according to the present invention.

Of course, it is also possible for the first brightness value to be the maximum possible brightness value (i.e. white, in this case) and for the second brightness value to be the minimum possible brightness value (i.e. black, in this case). In this case, an inverted representation will be generated (white text on black background). This is shown schematically in FIG. 3.

The recording unit 2 may be a conventional video camera or any other camera. In particular, it may also be provided, for example, in a form similar to a computer mouse which is moved over the text to be read.

In a further embodiment, the recording unit 2 constantly generates new recordings. This is the case, for example, if the recording unit 2 is similar in design to a computer mouse and is moved over the text to be read. These recordings are converted to a binary image as described and displayed by the display unit 5 as described.

Advantageously, the evaluating unit 3 does not derive a brightness threshold value for each recording of the recording unit 2. For example, the evaluating unit 3 derives a brightness threshold value only for every 10th recording, which brightness threshold value is then used by the image processing unit 4 for the sequential recordings until the evaluating unit 3 has derived a new threshold value and supplied it to the image processing unit 4. The number of recordings for which a determined brightness threshold value is used may be constant or may vary. In particular, the evaluating unit 3 may compare the brightness distribution from which the brightness threshold value was derived with the brightness distributions of the sequential recordings and may not determine a new brightness threshold value until the deviation has reached a predetermined magnitude.

Due to this not very frequent computation of the brightness threshold value, the required computing power of the evaluating unit 3 can be reduced, which leads to reductions in cost and weight. These measures allow to easily generate the desired binary image in real time.

The display unit 5 can also display enlargements of the binary image or images.

The invention claimed is:

1. An electronic visual aid to a user for reading text on a background by providing optimized contrast between the text and the background, the visual aid comprising:
   a video camera for generating a recording of the text on the background
      an computer, which is supplied with the recording of the text on the background, wherein the computer provides a brightness distribution profile of the recording, the brightness distribution profile having a single step shape comprising a first zone of low brightness and low frequency corresponding to the text, a second zone of great brightness and high frequency corresponding to the background, and a transition zone between the first zone and the second zone, the evaluating unit derives from said brightness distribution a brightness threshold value lying in the transition zone;
   an image generator which generates from the recording a binary image having only a first and a second predetermined brightness value, the image generator assigning to the pixels of the binary image the first predetermined brightness value when the brightness of a pixel of the recording is below the brightness threshold value, and assigning the second brightness value when a pixel of the recording is above the brightness value, thereby creating a high contrast binary image of the text on the background; and
   a display unit is provided as a head-mounted display device that presents the high contrast binary image of the text on the background such that the high contrast binary image is viewable by the user wearing the head mounted display device.

2. The electronic visual aid as claimed in claim 1, wherein the computer determines a histogram of the brightness distribution and subjects said histogram to low-pass filtering before derivation of the threshold value.

3. The electronic visual aid as claimed in claim 1, wherein the computer determines the threshold value on the basis of the gradient run of the brightness distribution.

4. The electronic visual aid as claimed in claim 2, wherein the computer determines the threshold value on the basis of a gradient run of the brightness distribution.

5. The electronic visual aid as claimed in claim 1, wherein the computer standardizes the brightness distribution before deriving the threshold value.

6. The electronic visual aid as claimed in claim 1, wherein the aid is constantly supplied with new recordings as the camera is moved over the text, and said evaluating unit derives the brightness threshold value for only one of a predetermined number of sequential recordings, and the image generator uses the thus derived brightness threshold value to generate the binary images from the recordings of the predetermined number of recordings.

7. An electronic visual-aid method for providing optimized contrast of text on a background to a human user, comprising:
   placing a video camera over the text on the background and generating a recording of the text on the background;
   determining a brightness distribution profile with a single step shape of the supplied recording of text on the background and deriving a brightness threshold value from said brightness distribution, said threshold value lying in a transition zone between a zone of brightness distribution associated with the background and a zone of brightness distribution associated with the information, the zone of brightness distribution associated with the information, the zone of brightness distribution associated with the background, and the transition zone defining the single step shape;
   generating from said recording a high contrast binary image having only two different, predetermined brightness values by respectively assigning to pixels of the binary image the first of the two predetermined brightness values, if the brightness of the corresponding pixel of the recording is below the brightness threshold value, and otherwise the second brightness value is assigned; and
   displaying the high contrast binary image using a head-mounted display device such that the human user of the head-mounted display visually perceives the high contrast binary image.

8. The method as claimed in claim 7, wherein a histogram is determined of the brightness distribution and the histogram is subjected to low-pass filtering before deriving the threshold value.

9. The method as claimed in claim 7, wherein the threshold value is determined on the basis of the gradient of the brightness distribution.

10. The method as claimed in claim 8, wherein the threshold value is determined on the basis of the gradient of the brightness distribution.

11. The method as claimed in claim 7, wherein the brightness distribution is standardized before deriving the threshold value.

12. The method as claimed in claim 7, further comprising moving the camera over the text generating thereby constantly generating new recordings, deriving for the constantly supplied recordings the brightness threshold value for only one of the recordings of a predetermined number of sequential recordings and using the thus determined brightness threshold value for the predetermined number of sequential recordings so as to generate the binary images.

13. An electronic visual-aid method for providing optimized contrast of text on a background to a human user, comprising:

moving a video camera over the text on the background thereby constantly generating sequential recordings of the text on the background;

for only one of each of a predetermined number of the sequential recordings, determining a brightness distribution profile with a single step shape of the supplied recording of an information carrier on which information visibly standing out from text on the background is represented and deriving a brightness threshold value from said brightness distribution, said threshold value lying in a transition zone between a zone of brightness distribution associated with the background and a zone of brightness distribution associated with the information, the zone of brightness distribution associated with the information, the zone of brightness distribution associated with the background, and the transition zone defining the single step shape;

generating from each of said predetermined number of the sequential recordings a high contrast binary image having only a first and a second different, predetermined brightness value; by assigning to the pixels of the binary image the first predetermined brightness value when the brightness of a pixel of the recording is below the brightness threshold value, and assigning the second predetermined brightness value when a pixel of the recording is above the brightness value, thereby creating a high contrast binary image of the text on the background; and displaying the high contrast binary image using a head-mounted display device such that the human user of the head-mounted display may visually perceive the high contrast binary image.

14. An electronic visual aid to a user for reading text on a background by providing optimized contrast between the text and the background while moving the camera over the text, the visual aid comprising:

a video camera for constantly generating sequential recordings of the text on the background as the camera is moved over the text;

a computer, which is supplied with the sequential recordings of the text on the background, wherein for only one of each of a predetermined number of the sequential recordings, the computer determines a brightness distribution profile of the one, the brightness distribution profile having a single step shape comprising a first zone of low brightness and low frequency corresponding to the text, a second zone of great brightness and high frequency corresponding to the background, and a transition zone between the first zone and the second zone, the evaluating unit derives from said brightness distribution a brightness threshold value lying in the transition zone;

an image generator which generates for each of said predetermined number of the sequential recordings a binary image having only two different, predetermined brightness values, by respectively assigning to the pixels of the binary image the first of the two brightness values when the brightness of the corresponding pixel of the recording is below the brightness threshold value, and otherwise assigning the second brightness value, thereby creating a high contrast binary image of the text on the background; and a display unit which displays the high contrast binary image of the text on the background and is provided as a head-mounted display device that presents the high contrast binary image of the text on the background such that the high contrast binary image is viewable by the user wearing the head mounted display device.

* * * * *